United States Patent
Brown et al.

[11] Patent Number: 5,585,959
[45] Date of Patent: Dec. 17, 1996

[54] LOW TRANSPARENCY COPPER OXIDE COATING FOR ELECTROCHROMIC DEVICE

[75] Inventors: Franklin I. Brown, Detroit, Mich.; Stephen C. Schulz, Benicia, Calif.

[73] Assignee: Ford Motor Company, Dearborn, Mich.

[21] Appl. No.: 5,206

[22] Filed: Jan. 15, 1993

Related U.S. Application Data

[63] Continuation of Ser. No. 732,010, Jul. 18, 1991, abandoned.

[51] Int. Cl.$^6$ .............................. G02F 1/15; G02F 1/153
[52] U.S. Cl. ..................... 359/273; 359/265; 359/269; 359/275
[58] Field of Search .................... 359/265, 269, 359/273, 275

[56] References Cited

U.S. PATENT DOCUMENTS

| | | | |
|---|---|---|---|
| 3,829,196 | 8/1974 | Deb | 359/275 |
| 3,971,624 | 7/1976 | Bruesch et al. | 359/267 |
| 4,110,259 | 8/1978 | Sichel | 359/273 |
| 4,293,194 | 10/1981 | Takahashi | 359/275 |
| 4,297,005 | 10/1981 | Johnson, Jr. et al. | 359/272 |
| 4,338,000 | 7/1982 | Kamimori et al. | 359/275 |
| 4,433,901 | 2/1984 | Takahashi et al. | 359/268 |
| 4,529,274 | 7/1985 | Iwata | 359/271 |
| 4,559,165 | 12/1985 | Kohlmuller et al. | 359/265 |
| 4,768,865 | 9/1988 | Greenberg et al. | 359/266 |
| 4,830,471 | 5/1989 | Demiryont | 359/265 |
| 4,850,684 | 7/1989 | Inaba et al. | 359/267 |
| 4,923,289 | 5/1990 | Demiryont | 359/265 |
| 4,940,315 | 7/1990 | Demiryont | 359/267 |
| 4,960,324 | 10/1990 | Brown | 359/265 |

*Primary Examiner*—Mahshid Saadat
*Attorney, Agent, or Firm*—Lorraine S. Melotik; Roger L. May

[57] ABSTRACT

Low transparency, or colored, copper oxide is taught as a new electrochromic material, in combination with a metallic oxide. The material is formed by application of the copper oxide to a substrate followed by application of the metallic oxide. A low-E glass substrate is heated, and cupric acetylacetonate powder is sprayed at the glass; the cupric acetylacetonate powder is atomized with dry oxygen. The glass/$SN_NO_2F/Cu_xO$ system is then re-heated. After reheating, tungsten hexachloride dissolved in N,N-dimethyl formamide is sprayed at the copper oxide on the substrate. In a sample material, visible transmission is improved from 33% for copper oxide alone, to 65%.

10 Claims, 1 Drawing Sheet

FIG. 1
CATHODIC MATERIAL
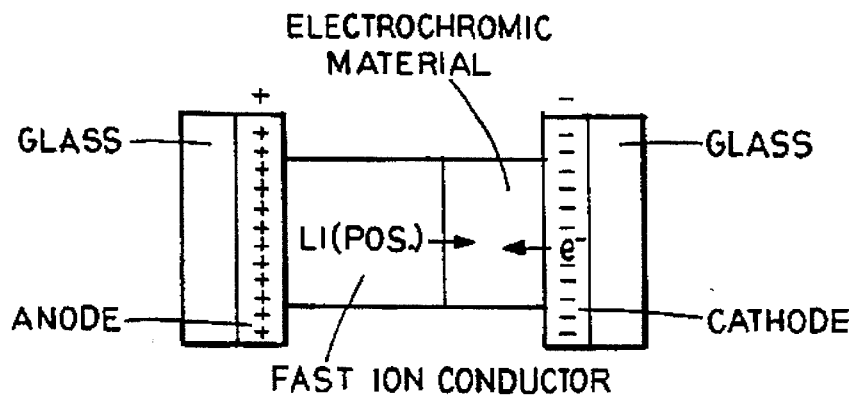
REDUCTION — GAIN OF ELECTRONS
LI(POS) AND e⁻ (NEG) INCLUSION
OR LI(NEG) AND HOLE EXTRACTION
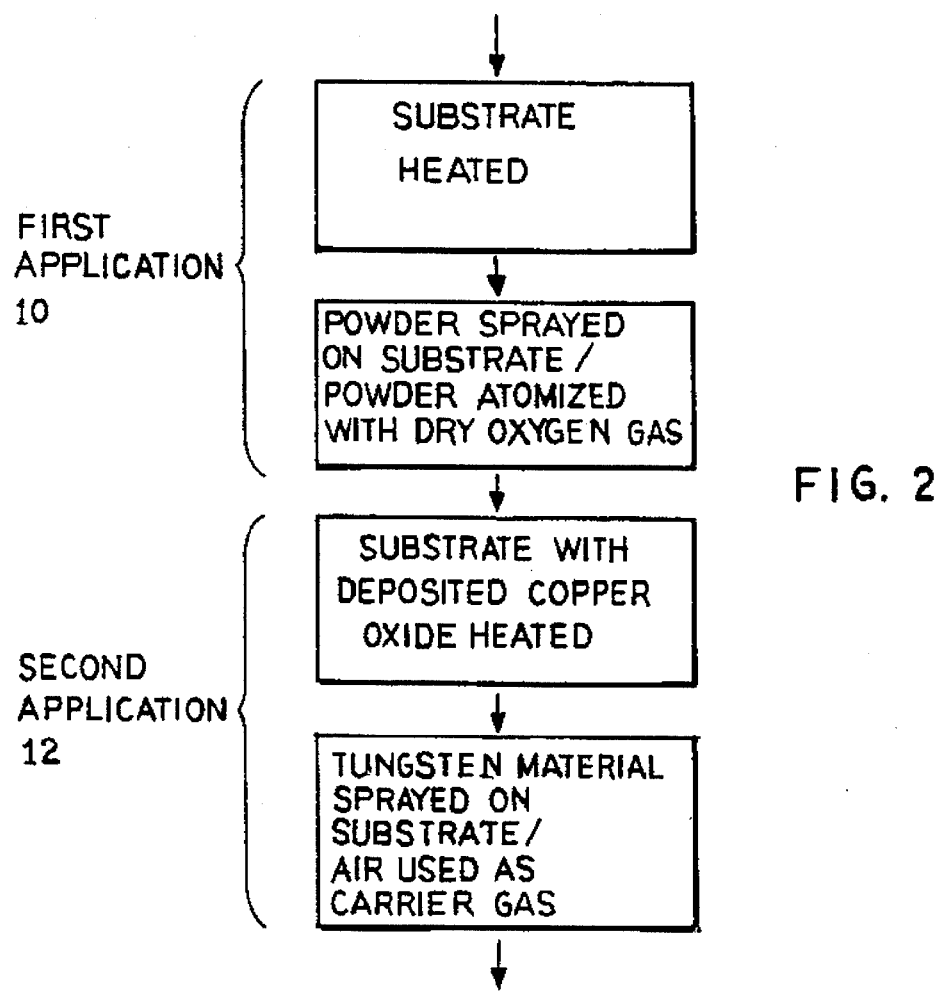
FIG. 2

5,585,959

LOW TRANSPARENCY COPPER OXIDE COATING FOR ELECTROCHROMIC DEVICE

This application is a continuation of application Ser. No. 07/732,010, filed Jul. 18, 1991, now abandoned.

BACKGROUND OF THE INVENTION

1. Field of the Invention

This invention relates to transparent film layers deposited on the surfaces of non-metallic substrates, such as glass, to a new electrode in an electrochromic device, to a new electrochromic device, and to a method of making a copper oxide electrochromic device.

2. Description Of The Related Art

Electrochromism is a coloring phenomenon observed in some materials when they are placed in the presence of an electrical field. Such materials are normally uncolored when no electrical field is present, but change to a colored state when an electrical field is placed around the materials.

A material exhibiting reversible color changes is known as an electrochromic material (ECM). The phenomenon of transition from an uncolored state to a colored state in response to the presence and absence of an electrical field is called optical switching. If a thin coating of an ECM is placed on a glass support, the entire device is known as a switchable window. When no electrical field is placed on the ECM of a switchable window, the ECM is uncolored and transparent and thus one can look through the window. On the other hand, when an electric field is placed on the ECM, it colors, thereby reducing the amount of light transmitted through the window. The reduction of light transmission may be partial or total, either reducing the amount of light which passes through the window or eliminating it altogether.

Certain transition metal oxides are known to exhibit electrochromism. Materials such as tungsten oxide, molybdenum oxide, and vanadium oxide are known electrochromic materials. U.S. Pat. No. 4,830,471, issued to Hulya Demiryont, discloses an ECM comprising uncolored copper oxide. At column 6, lines 43–60, this patent teaches that "uncolored copper oxide" as an ECM is defined by its inventor as a layer of copper oxide which is transparent after it is laid down. U.S. Pat. No. 4,830,471 dismisses from the category of ECM's copper oxide with a colorish cast to it: "[I]t will not work as a suitable electrochromic material". U.S. Pat. No. 4,830,471, column 6, lines 45–48.

A good electrochromic device includes five layers: a transparent electrode, a counter electrode, an ion conducting layer, an electrochromic film, and a transparent electrode. A purpose of a counter electrode is to balance the chemical reaction which occurs at the boundary layer of the electrochromic layer, to avoid disintegration of the ion conducting layer.

It is an object of this invention to provide a new electrochromic material.

It is a feature of this invention that a new electrochromic material is provided which may include colored copper oxide.

It is an advantage of this invention that a newly provided ECM having copper oxide can be readily made.

It is another object of this invention to provide an electrochromic device having a new ECM therein.

It is another feature of this invention that a electrochromic device can be constructed with a newly provided ECM having a layer of copper oxide and a layer of tungsten oxide.

It is another advantage of this invention that an electrochromic device can be constructed using a newly provided ECM having a layer of copper oxide and a layer of tungsten oxide provided by pyrolytic film deposition.

It is yet another object of this invention to provide a method of making a copper oxide electrochromic device by layering of colored copper oxide and tungsten oxide.

It is still another object of this invention to provide a new material for a counter electrode.

DISCLOSURE OF THE INVENTION

This invention is directed to a new electrochromic material. In particular, this invention is directed to a new electrochromic material comprising a low transparency copper oxide film and immediately thereover a film of tungsten oxide. The terms "immediately thereover" and "immediately over", concerning the location of one film in relation to another film, shall be interpreted to exclude films which are spaced and isolated from the referenced other films.

The invention is also directed to a new electrochromic device. The electrochromic device comprises an anode, a cathode, a fast ion conductor capable of generating ions when an electric field is applied thereto, the fast ion conductor also permitting ion movement therethrough while prohibiting electron movement therethrough, and a low transparency copper oxide film and immediately thereover a film of tungsten oxide. The fast ion conductor and the copper oxide-tungsten oxide films are arranged between the anode and the cathode.

The invention is also a method of making a copper oxide electrochromic device. In this method, a substrate with a pyrolytic $S_nO_2.F$ coating is heated. Cupric acetylacetonate powder is sprayed at the coating. Dry oxygen gas is employed to atomize the cupric acetylacetonate powder. The glass/$S_nO_2.F/Cu_xO$ system is then re-heated. Tungsten hexachloride dissolved in N,N-dimethyl formamide is sprayed at the surface.

The invention is also directed to a new material for a counter electrode in an electrochromic device.

In preferred embodiments of the electrochromic material, device, counter electrode and method, the copper oxide film has a thickness of approximately 800 Angstroms and the tungsten oxide film also has a thickness of approximately 800 Angstroms.

BRIEF DESCRIPTION OF THE DRAWING

The novel features that are considered characteristic of the invention are set forth with particularity in the appended claims. The invention itself, however, both as to its organization and its method of operation, together with additional objects, features and advantages thereof, will best be understood from the following description of specific embodiments when read in connection with the accompanying drawings in which:

FIG. 1 is a schematic illustration of the operation of an electrochromic material; and FIG. 2 is a block diagram of a method of the invention.

DETAILED DESCRIPTION OF THE PREFERRED EMBODIMENT

The following description is what we consider to be the preferred embodiments of our invention. The following description also sets forth what we now contemplate to be the best mode of construction for an inventive electrochromic device. The description is not intended to be a limitation upon the broader principles of this invention.

In FIG. 1, the operation of a cathodic ECM is schematically illustrated. In the cathodic case, an electrochromic material of the cathodic type is physically located next to a cathode which has been placed, for example, on a glass substrate. A fast ion conductor material, which produces light ions of a positive charge, for example, lithium ions, is placed between the electrochromic material and an anode. The anode may also be placed on a glass substrate.

In the cathodic case, the electrochromic material is subjected to a reduction or gain of electrons when an electric field is applied to the material. Application of the electric field is indicated by the plurality of negative signs shown on the anode and the plurality of negative signs shown on the cathode. As a result of the application of an electric field, of appropriate strength and sign, applied between the anode and the cathode, positive light ions are driven from the fast ion conductor into the electrochromic material, and electrons are supplied to the electrochromic material from the cathode.

The positively charged light ions and the negatively charged electrons associate themselves with the electrochromic material to reduce the same, thereby moving the electrochromic material from a base state to a reduced state. In the base state, the electrochromic material is uncolored, but in its reduced state, it is colored.

When the electric field is removed, the electrochromic material will return to its base state, that is, its uncolored state. The period of time required for return of the material to its uncolored state varies from material to material and is generally referred to as the memory of the ECM. Some materials have relatively short memories and others have prolonged memories.

While the operation of the cathodic material has been illustrated by the inclusion in the electrochromic material of positive light ions and negative electrons, the cathodic operation may also take place by the extraction of negative light ions and holes from the electrochromic material to the fast ion conductor and the cathode, respectively.

The operation of a cathodic ECM is illustrated by way of example. An ECM made according to the invention is made on a non-metallic surface, specifically a glass surface, by means of a tungsten oxide overcoat on a previously deposited non-transparent copper oxide film. In accordance with the invention, copper oxide ($Cu_xO$) film and tungsten oxide ($WO_3$) film may be made by pyrolytic process off line on a vertical lehr. An example follows of the practice of the invented method by the inventors.

Primarily, there may be two or more cycles of heating and spraying, to be described. Each cycle of heating and spraying is called one application. Referring to FIG. 2, films were made in two applications 10, 12.

During a first application, a substrate, 12"×12"×⅛" low E glass (glass coated with $S_nO_2.F$) was heated in a vertical furnace to a temperature of 1080° F. Upon exiting the furnace to room temperature, 5 g of cupric acetylacetonate powder was sprayed on the hot glass/$S_nO_2.F$ surface with a Binks model 171, hand held floccing gun. The distance from the $S_nO_2.F$ surface to the gun nozzle was approximately 5 inches. Dry oxygen gas was used for atomizing the cupric acetylacetonate powder, and the atomization pressure was 50 psi. The applied copper oxide film had a thickness of about 800 A and a visible transmission of about 33%.

During a second application, the glass/$S_nO_2.F/Cu_xO$ system obtained by the first application was heated in a vertical furnace to a temperature of 1080° F. Upon exiting the furnace to room temperature, a room temperature solution of 3 g tungsten hexachloride dissolved in 100 g N,N-dimethyl formamide was sprayed on the hot $Cu_xO$ surface with a Devilbiss model JGV-560 hand held spray gun using air as the carrier (atomization) gas. The solution atomization pressure was 50 psi and the distance from the $Cu_xO$ surface to the gun nozzle was approximately 5 inches. The applied tungsten oxide film had a thickness of about 800 A.

The visible transmission of the glass/$S_nO_2.F/Cu_xO$ system was 33% and that of the glass/$S_nO_2.F/Cu_xO/WO_3$ system was 65%. It is believed that metallic oxide overcoats on $Cu_xO$ produce a similar effect if the metallic oxide film has a transmission higher than the transmission of $Cu_xO$ film.

It is also believed that the advantages and results of the invention are provided through a range of thicknesses of the tungsten oxide and copper oxide layers, from approximately 100 A to approximately 2500 A. Further, it is believed the advantages and results are provided through a range of temperatures of the substrate at the time of spraying, from approximately 900° F. to approximately 1135° F.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

What is claimed:

1. A light transparent electrochromic film stack comprising a film of low transparency copper oxide material and a film of metallic oxide, wherein the film stack has a visible transmission greater than that of the low transparency copper oxide material.

2. An electrochromic material as in claim 1 in which the metallic oxide is tungsten oxide.

3. An electrochromic material as in claim 1 in which the film of low transparency copper oxide and the film of metallic oxide each have a thickness in the range of approximately 100 A to approximately 2500 A.

4. An electrochromic material as in claim 1 in which the film of low transparency copper oxide and the film of metallic oxide have substantially the same thickness.

5. An electrochromic material as in claim 2 in which the film of low transparency copper oxide has a thickness of approximately 800 Angstroms and the film of tungsten oxide has a thickness of approximately 800 Angstroms.

6. An electrochromic device comprising:

a metal oxide anode;

a metal oxide cathode;

a fast ion conductor located between the metal oxide anode and metal oxide cathode capable of generating ions when an electric field is applied thereto, the fast ion conductor also permitting ion movement while prohibiting electron movement therethrough; and an electrochromic film stack located between the metal oxide anode and the metal oxide cathode including a low transparency copper oxide film and immediately thereover, a film of metallic oxide wherein the film stack has a visible transmission greater than that of the low transparency copper oxide film.

7. An electrochromic device as in claim 6 in which the metallic oxide is tungsten oxide.

8. An electrochromic device as in claim 6 in which the film of copper oxide and the film of metallic oxide have substantially the same thickness.

9. An electrochromic device as in claim 7 in which the film of copper oxide has a thickness of approximately 800 Angstroms and the film of tungsten oxide has a thickness of approximately 800 Angstroms.

10. An electrochromic device comprising:

a first transparent metal oxide electrode;

a counter electrode further comprising a film stack including a low transparency copper oxide film and immediately thereover, a film of metallic oxide, wherein the counter electrode has a visible transmission greater than that of the low transparency copper oxide film;

a fast ion conducting layer;

an electrochromic layer; and a second transparent metal oxide film.

* * * * *